United States Patent
Anderson et al.

(10) Patent No.: US 7,136,175 B2
(45) Date of Patent: Nov. 14, 2006

(54) PRINTING DEVICE WITH DELAYED WARM-UP OPERATION

(75) Inventors: Bradley J. Anderson, Boise, ID (US); Bruce L. Johnson, Eagle, ID (US); Leonard T. Schroath, Boise, ID (US); William I. Herrmann, Eagle, ID (US); Elen S Hunt, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 520 days.

(21) Appl. No.: 10/166,967

(22) Filed: Jun. 10, 2002

(65) Prior Publication Data

US 2003/0227642 A1    Dec. 11, 2003

(51) Int. Cl.
G06K 15/00    (2006.01)
H04N 1/36    (2006.01)

(52) U.S. Cl. .................................. 358/1.14; 358/442

(58) Field of Classification Search ............. 358/1.14, 358/1.15, 1.9, 406, 422; 399/19
See application file for complete search history.

(56) References Cited

U.S. PATENT DOCUMENTS

| | | | |
|---|---|---|---|
| 4,987,513 A | 1/1991 | Shelley | 361/92 |
| 5,459,358 A | 10/1995 | Rose | 307/139 |
| 5,589,923 A * | 12/1996 | Lee et al. | 399/78 |
| 5,930,551 A * | 7/1999 | Nakazato et al. | 399/1 |
| 6,094,546 A * | 7/2000 | Nakazato et al. | 399/1 |
| 6,191,739 B1* | 2/2001 | Gabber | 342/458 |
| 6,226,472 B1* | 5/2001 | Yun | 399/81 |
| 2002/0097423 A1* | 7/2002 | Qiao | |
| 2003/0098986 A1* | 5/2003 | Pop | 358/1.9 |
| 2006/0072131 A1* | 4/2006 | Haikin et al. | 358/1.9 |

FOREIGN PATENT DOCUMENTS

| | | | |
|---|---|---|---|
| JP | 2000001022 A * | 1/2000 | |
| JP | 2000-312333 | * 4/2000 | |
| JP | 200094794 A * | 4/2000 | |
| JP | 2002318674 | * 10/2002 | |

* cited by examiner

Primary Examiner—Jerome Grant, II

(57) ABSTRACT

A method of powering up a printing device having a component that employs a warm-up operation, the method including, upon receiving power to the printing device, detecting delay indicia, and selectively delaying the warm-up operation based on the detected delay indicia.

15 Claims, 5 Drawing Sheets

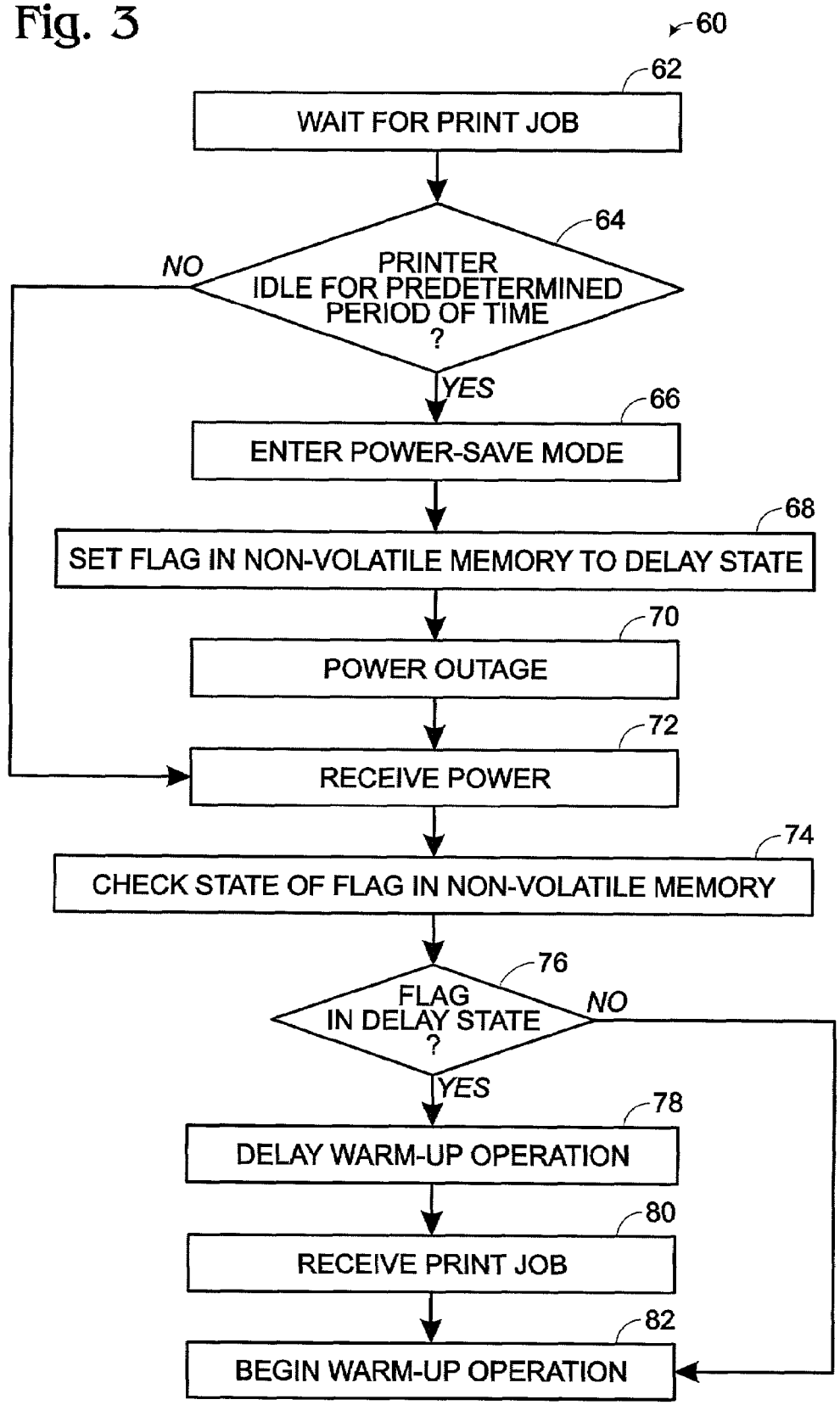

PRINTING DEVICE WITH DELAYED WARM-UP OPERATION

TECHNICAL FIELD

The present invention relates generally to printing devices, and more particularly, to method and apparatus to delay commencement of a warm-up operation in a printing device.

BACKGROUND OF THE INVENTION

Power interruptions are a relatively common occurrence, and may cause any of a number of problems in business and industrial settings. Interruptions can be either unplanned, such as those caused by severe weather or a power grid failure, or planned, such as rolling blackouts necessitated by power shortages. In either case, an interruption may completely shut down all electrically powered devices in the affected area, possibly causing loss of productivity, as well as problems during subsequent power-up of the devices.

One problem that may occur during power-up is excessive loading of a power supply circuit by the simultaneous power-up of many devices. Upon restoration of power after an interruption, many of the affected devices may restart automatically, and thus simultaneously, as soon as power is restored. Some of these devices may draw large amounts of current during power-up. For example, printing devices that print an image using toner typically have a component known as a fuser for fusing the individual grains of toner to the page and to each other. A fuser typically includes one or more heated rollers that melt the toner grains with a combination of heat and pressure. Fusers may be found in many different types of printing devices, such as laser printers, copiers and facsimile machines, etc.

Before these printing devices can be used to print, the fuser must be warmed up. This process can potentially take a long time. Therefore, to speed up the warm-up process, some printing devices use large currents to heat the fuser. If multiple printing devices are powered up at the same time on a single power line, the current drain may be large enough to cause the electrical breaker on the power supply circuit to trip, or may actually damage some equipment. This may cause power to all the devices on the power line to again lose power, increasing the down time of the devices and increasing the amount of employee time wasted in bringing the affected devices up and running again.

SUMMARY OF THE INVENTION

A method of powering up a printing device having a component that employs a warm-up operation, the method including, upon receiving power to the printing device, detecting delay indicia, and selectively delaying the warm-up operation based on the detected delay indicia.

BRIEF DESCRIPTION OF THE DRAWINGS

FIG. 3 is a flow diagram of a method of powering up a printing device according to one embodiment of the present invention.

DETAILED DESCRIPTION OF THE PREFERRED EMBODIMENT

Figure 1:
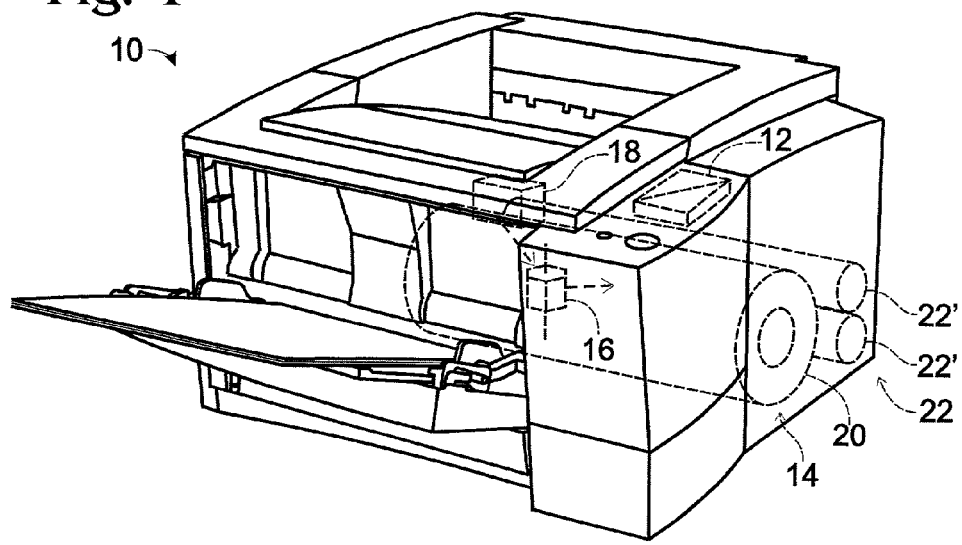
FIG. 1 is an isometric view of a printing device according to an embodiment of the present invention.

A printing device according to first embodiment of the present invention is depicted generally at 10 in FIG. 1. Printing device 10 includes a formatter, indicated schematically at 12, and a print engine, indicated generally at 14. Formatter 12 is configured to format a print job into a printable image, and print engine 14 is configured to print the printable image onto media. As indicated, some of the major components of print engine 14 may include a mirror 16, a laser 18, a rotating drum 20 and a fuser 22. Mirror 16 is configured to direct a beam from laser 18 onto a rotating charged drum 20. The laser beam neutralizes the charge on drum 20 where it hits the drum. Mirror 16 can be moved to change the location of laser 18 on drum 20, and can thus be used to form on the drum a negative of an image to be printed. Drum 20 then rotates through a toner supply (not shown), picks up toner on its neutralized surfaces, and deposits the toner on a media that is moving underneath the drum.

After receiving the toner, the media passes through fuser 22. Fuser 22 of the depicted embodiment includes two rotating, heated drums 22' between which the media is passed. Heat and pressure from drums 22' melts the toner grains, bonding them to the paper and to each other. While printing device 10 is depicted in FIG. 1 as a laser printer, it will be appreciated that the printing device of the present invention may be any other suitable type of printing device, including, but not limited to, a photocopier, facsimile or multifunctional machine. Furthermore, although printing device 10 is depicted as a desktop-sized device, the printing device of the present invention may be of any desired size, large or small format.

Figure 2:
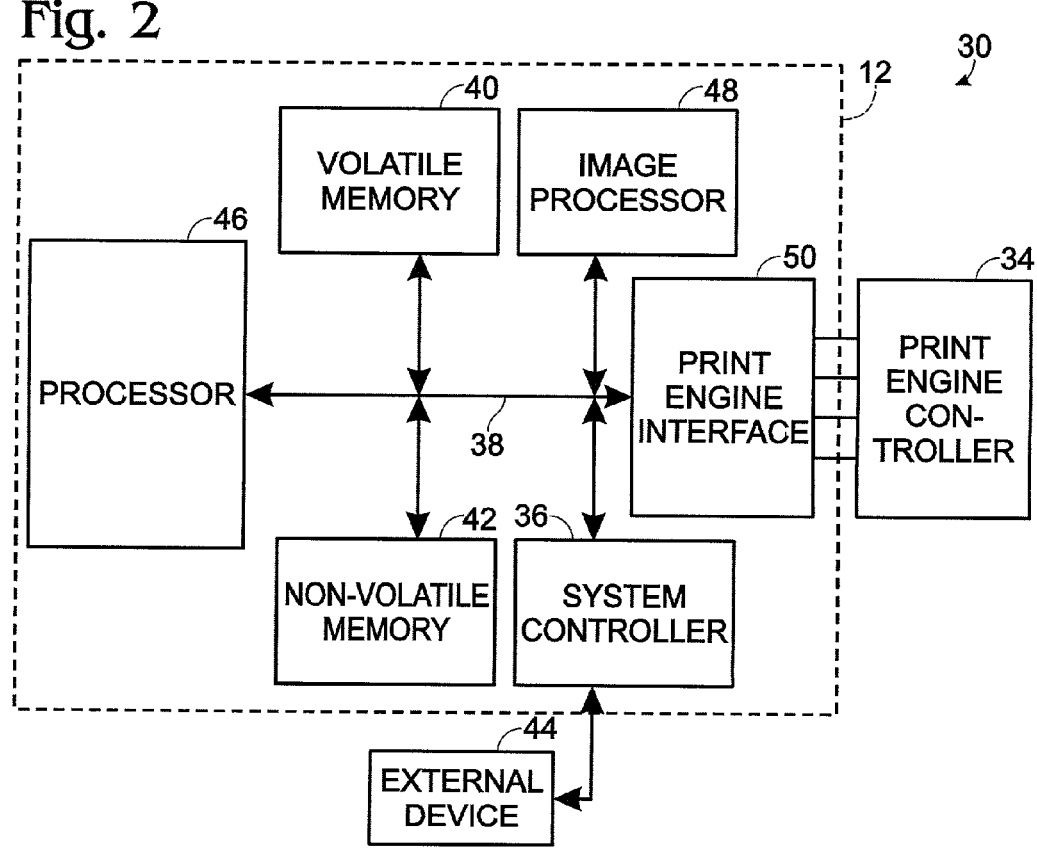
FIG. 2 is a block diagram of an exemplary logic system suitable for use with the printing device of FIG. 1.

FIG. 2 shows generally, at 30, a simple block diagram of a suitable logic system for printing device 10. Logic system 30 includes a formatter, indicated by the dashed line at 12, and a print engine controller 34. Formatter 12 is configured to format a print job for printing, and may include any suitable components for performing the formatting. For example, formatter 12 typically includes a system controller 36 for performing such functions as memory management, clock distribution and control of an internal bus 38. It will be appreciated that these particular functions are listed for exemplary purposes, and that system controller 36 may be configured to control any other desired system function.

Formatter 12 also includes memory, typically both volatile memory 40 and non-volatile memory 42. Non-volatile memory 42 is typically utilized for such functions as storing printer software, fonts and other permanent or semi-permanent data. Non-volatile memory 42 also may store instructions for performing the methods of delaying commencement of the warm-up operation of fuser 22 that are described in detail below. Any suitable type of non-volatile memory may be used for non-volatile memory 42. Examples include ROM, PROM, EPROM, EEPROM and Flash memory, and combinations thereof.

Volatile memory 40 is typically configured to store pending print jobs received from an external device 44, for example, a printer server. The print jobs are typically received at system controller 36, and then passed into volatile memory 40. Volatile memory 40 may also be configured to store instructions loaded into the volatile memory from non-volatile memory 42 while the instructions are being executed. Volatile memory 40 may be any suitable type of volatile memory, such as SRAM or DRAM, and may include more than one type of memory.

Formatter 12 also includes a processor 46. Processor 46 is typically configured to control the preparation and formatting of information contained within a print job for printing. Thus, processor 46 is typically configured to read and execute instructions contained within a print job that are written in a page description language (PDL), such as Printer Control Language (PCL) or PostScript. Instructions written in a PDL that are contained within the print job typically include such instructions as which font or fonts to apply to the information, the location at which each page begins and ends, and other page appearance information. Processor 46 may execute instructions compatible with either a single PDL, or multiple PDL's.

Formatter 12 may also include other components, for example a raster image processor 48. Raster image processor 48 typically converts formatted print job information into a printable bitmap image, and may also perform other functions such as enlarging the image to be printed. Once formatter 12 has completed formatting a print job, the formatter typically sends the print job to print engine controller 34 via print engine interface 50. Print engine controller 34 then may drive the mechanical parts of print engine 14 to form the image on the media.

In order to fuse the individual toner grains to the media, and to each other, the cylinders of fuser 22 typically are kept at a relatively high temperature. Thus, when starting up, fuser 22 typically must be warmed up before printing device 10 can be used for printing. Where a large number of printing devices share the same power circuit, the simultaneous warming up of the fusers on each printing device can cause a significant strain on the power circuit, which may cause a breaker on the circuit to trip. To prevent this from occurring, printing device 10 may be configured to delay its fuser warm-up operation, if necessary, until other devices that may be on the same power line have completed warming up. Printing device 10 typically accomplishes this delay by detecting preselected delay indicia, determining a current state of the delay indicia to see whether the indicia indicates that of the warm-up operation is to be delayed, and if a delay is indicated, then selectively delaying the warm-up operation.

FIG. 3 shows, generally at 60, a method of powering up a printing device after a power interruption in accordance with a first embodiment of the invention. It will be appreciated that "power interruption", as used herein, refers generally to an interruption in the supply of power, regardless of whether such interruption is planned or unplanned. Method 60 takes advantage of the fact that not all printing devices on a single power line may be in use when power is lost during an interruption. This is because some printing devices, after being idle for a predetermined amount of time, may enter a power save mode in which power for heating the fuser is temporarily suspended. The fuser thus may be allowed to cool until a new print job is received, at which time the fuser is again heated and the print job is printed. Method 60 allows a printing device to restart in the power-save mode when power is resumed after an interruption if the printing device was in the power-save mode before the interruption.

Method 60 first includes waiting for a print job at 62. If the printer remains idle for a predetermined period of time at 64, then printing device 10 may enter a power-save mode at 66 in which power to fuser 22 is temporarily suspended. When printing device 10 enters the power-save mode at 66, delay indicia in the form of a flag in non-volatile memory 42 may be set at 68 to a delay-indicating state, signifying that the printing device is in the power-save mode. Likewise, if the printer has not been idle at 64 for a long enough period of time for the printing device to enter the power-save mode, then the flag may not be set to the delay-indicating state, but instead left in a non-delay state. It is to be appreciated that the flag may be set to the delay state at any time, independent of the power-save mode, perhaps selectively upon initial start-up based on priority of the printing device.

Upon a power interruption at 70, and power restoration at 72, formatter 12 checks the state of the flag at 74. If it is determined at 76 that the flag is in the delay-indicating state, then printing device 10 may delay the warm-up operation as indicated at 78. This may be accomplished, for example, by power-up in the power-save mode, delaying commencement of the warm-up operation for a predetermined delay time. Any suitable predetermined delay time may be used. For example, the end of a delay may be triggered by occurrence of an event, or the passage of a predetermined amount of time. In this embodiment, the end of the predetermined delay may be triggered by receipt of a new print job at 80, which causes printing device 10 to exit the power-save mode and commence fuser warm-up at 82. Upon completing warm-up, the flag may be rest to its non-delay state until such time as the printing device again enters a power save mode.

Thus, fuser 14 may not be heated up until a print job is received. In this manner, each printer affected by a power interruption that was in the power-save mode before the power interruption may power up in the power-save mode as well, and may not warm up until a print job is received. However, if it is determined, at 76, that the flag is in the non-delay state, then the printing device may commence fuser warm-up at 82 immediately after power is restored.

Similarly, the warm-up operation may be delayed by utilizing reduced power to effect warm-up at a slower rate. Thus, current drain may be more appropriately distributed.

The flag in non-volatile memory 42 may have any suitable form. For example, the flag may be a single bit in non-volatile memory 42, or may have a more complex form and contain information other than whether printing device 10 was in the power-save mode before power was lost.

When printing device 10 is shut down and restarted by a user, as opposed to being shut down by a power interruption, the user will typically desire the printer to warm up as quickly as possible when it is turned back on. Therefore, printing device 10 may be configured to set the flag in non-volatile memory 42 to the non-delay state whenever a user initiates power-down of the printing device. In this manner, printing device 10 would warm up immediately when power is resumed after a user-initiated power shut down.

Figure 4:
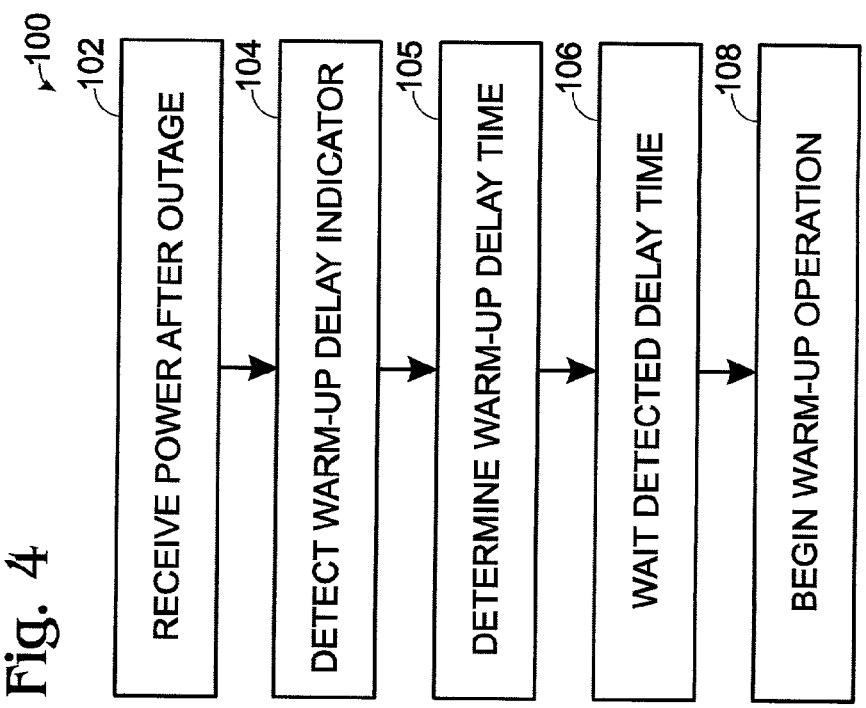
FIG. 4 is a flow diagram of a method of powering up a printing device according to another embodiment of the present invention.

FIG. 4 shows generally, at 100, a method of powering up a printer after a power interruption in accordance with a second embodiment of the invention. Rather than employing a flag in non-volatile memory, method 100 employs delay indicia in the form of a warm-up delay time, either selected or generated by processor 46 (or other component), upon restoration of power to printing device 10. Method 100 may first include receiving power after an interruption, at 102, and then detecting a warm-up delay indicator at 104. Next, the delay time generated or selected by processor 46 may be determined at 105. Next, printing device 10 may wait the indicated warm-up delay time at 106 before beginning the warm-up operation at 108. Typically, different printing devices on a single power line will select different delay times. This may cause some printing devices not to warm up until others have completed the fuser warm-up operation, thus decreasing the load on the power line. Typically, the warm-up delay time is selected from a plurality of possible delay times. A selected delay time other than zero may be thought of as delay indicia.

The warm-up delay may correspond either to a length of time that passes before fuser 22 is warmed up, or to the location in the overall start-up routine of printing device 10 at which the fuser warm-up operation begins. The overall start-up routine of printing device 10 typically includes many steps, some of which will now be described. First, formatter 12 may be initialized. Initializing formatter 12 may include such individual steps as testing volatile memory 40 and non-volatile memory 42, booting up the formatter operating system, booting up printer applications, initializing network cards, checking preferences, etc. Once the initialization of formatter 12 has been completed, print engine 14 may be initialized. Initialization of print engine 14 typically includes starting motors, performing color calibration routines and paper sensor checks, and warming up the fuser.

One suitable way to delay commencement of the fuser warm-up operation may be to delay initializing the print engine once the initialization of the formatter is complete. Under this scheme, printing device 10 may sit idle after the completion of the formatter initialization until the end of the delay time, at which point the print engine initialization process may begin.

Alternatively, the warm-up delay may correspond to the place in the overall start-up routine at which fuser 22 is warmed up. For example, delay indicia state may indicate that fuser 22 is to be warmed up while the formatter is initializing, before the print engine initialization process begins. This may result in the fuser being warmed up earlier than if the warm-up is performed as part of the print engine initialization process. Likewise, the delay indicia state may indicate that fuser 22 is to be warmed up only after all other power-up procedures have been completed.

The delay indicia of method 100 may include any suitable group or range of delay times. For example, the possible delay times may include a selection of two or three delay times spaced far enough apart in time to allow printing devices with shorter delay times to complete fuser warm-up before printing devices with longer delays begin fuser warm-up.

Figure 5:
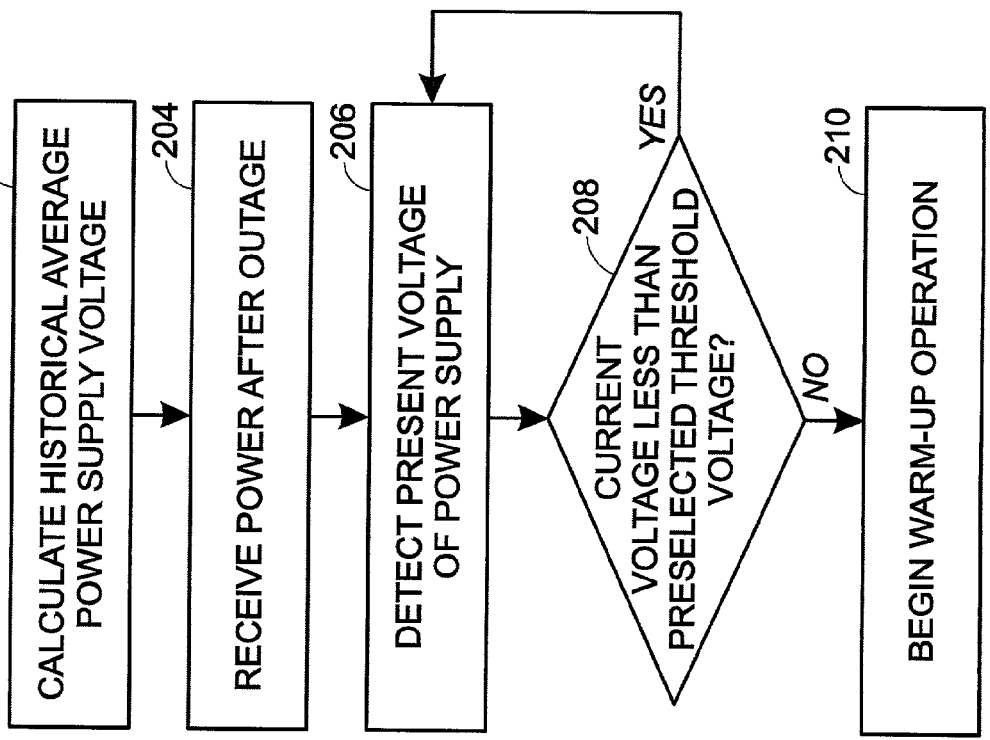
FIG. 5 is a flow diagram of a method of powering up a printing device according to yet another embodiment of the present invention.

FIG. 5 shows generally, at 200, a method of powering up a printing device according to a third embodiment of the present invention. Method 200 may include first calculating a historical average power supply voltage at 202 during ordinary printing device operation. This historical average power supply voltage may be used as a threshold or reference voltage to which a current (or instantaneous) power supply voltage measured after a power interruption may be compared. A current power supply voltage that is lower than the historical power supply voltage may be an indication that another printing device on the same power line is warming up its fuser. The historical average power supply voltage may be stored in non-volatile memory so that it can be referenced after a power interruption.

Method 200 next includes receiving restored power after a power interruption at 204. Once power is restored, printing device 10 may detect delay indicia at 206 by determining present power supply voltage. Then, printing device 10 may compare the present power supply voltage to the historical average power supply voltage at 208 to determine whether the present voltage is less than the predetermined threshold voltage, which can be either the historical average power supply voltage, or some other voltage.

If the present power supply voltage is less than the historical average voltage, then commencement of the fuser warm-up may be delayed. Method 200 then may cycle through steps 206 and 208 until the power supply voltage surpasses the threshold voltage, indicating that the other component has completed its warm-up operation. Once the present power supply voltage surpasses the threshold voltage, the fuser warm-up operation of printing device 10 may begin at 210. While measuring a historical average of the power supply voltage provides a convenient and reliable benchmark on which the threshold voltage may be based, it will be appreciated that a threshold voltage may also be selected in any other manner, for example, by user input.

In many use environments, printing device 10 may be connected to a data network to receive print jobs from a plurality of devices. In this situation, printing device 10 may be configured either to locate delay indicia on a remote network device (such as another printing device or a server), or to provide delay indicia to other network devices. An example of a network on which printer 10 may be used is shown generally at 300 in FIG. 6. Printing device 10 may be connected to network 300 in any suitable manner. For example, printing device 10 may have a direct connection to network 300, as indicated at 10'. Likewise, printing device 10 may be connected to network 300 via a host computer 302, as indicated at 10", or via a print server 304, as indicated at 10'". Network 300 will also typically include other devices, such as computer work stations 306 and file servers 308. Network 300 may be any type of data network, for example a local area network (LAN) or wide area network (WAN), and may have any suitable topology.

Figure 6:
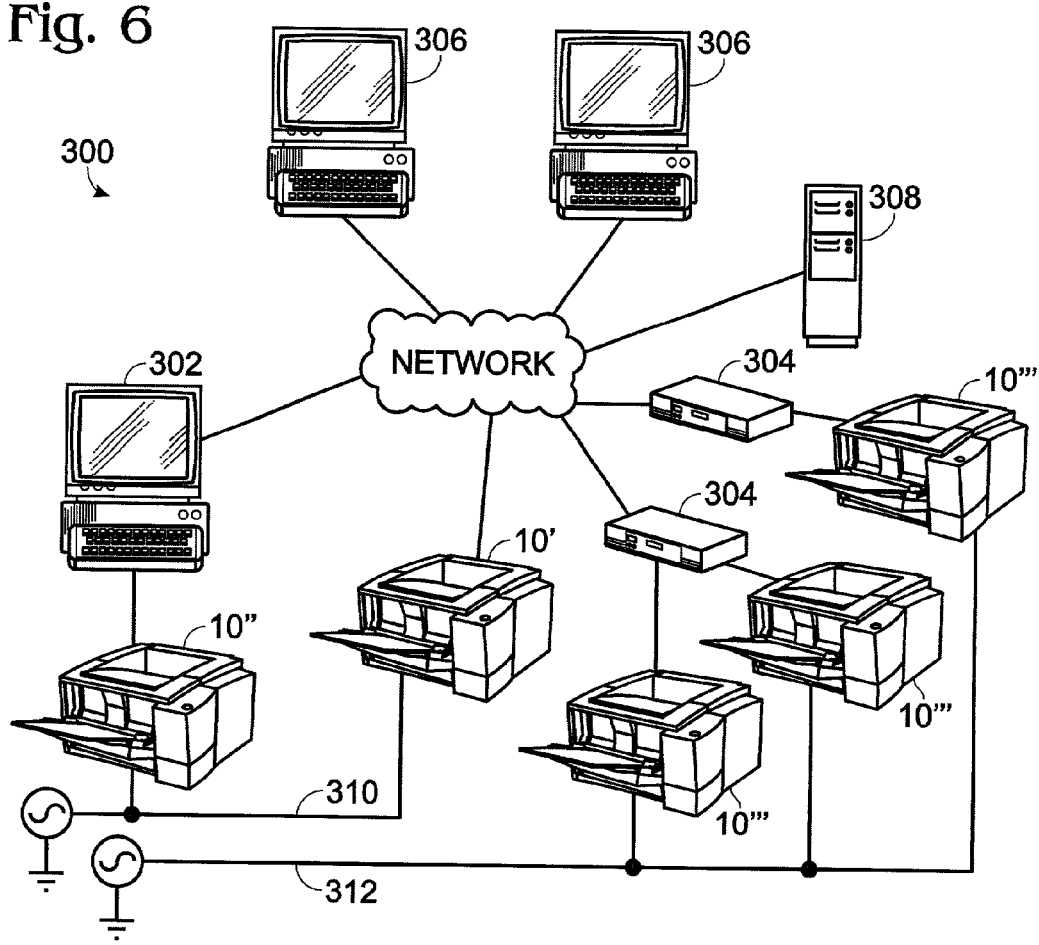
FIG. 6 is a schematic diagram of a computer network having a plurality of printing devices according to an embodiment of the present invention.

In an office or industrial setting, a single power line may power more than one printing device 10. Thus, FIG. 6 also shows a plurality of power lines that provide power to the printing devices on network 300. Any number of printing devices 10 on network 300 may be connected to a single power line, and more than one power line may be used to power printing devices 10 on a single network. For example, FIG. 6 depicts a first power line 310 powering printing devices 10' and 10", and a second power line 312 powering printing devices 10'".

Figure 8:
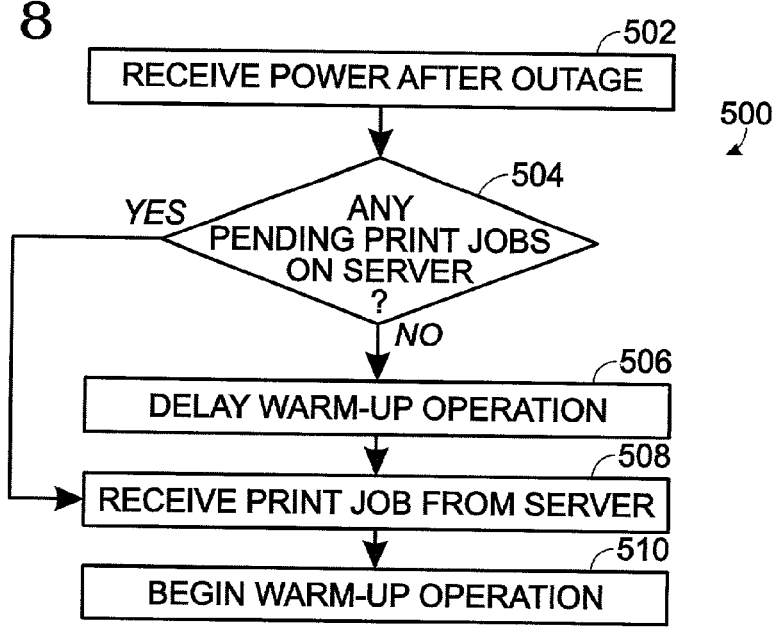
FIG. 8 is a flow diagram of a method of powering up a printing device according to still another embodiment of the present invention.
Figure 7:
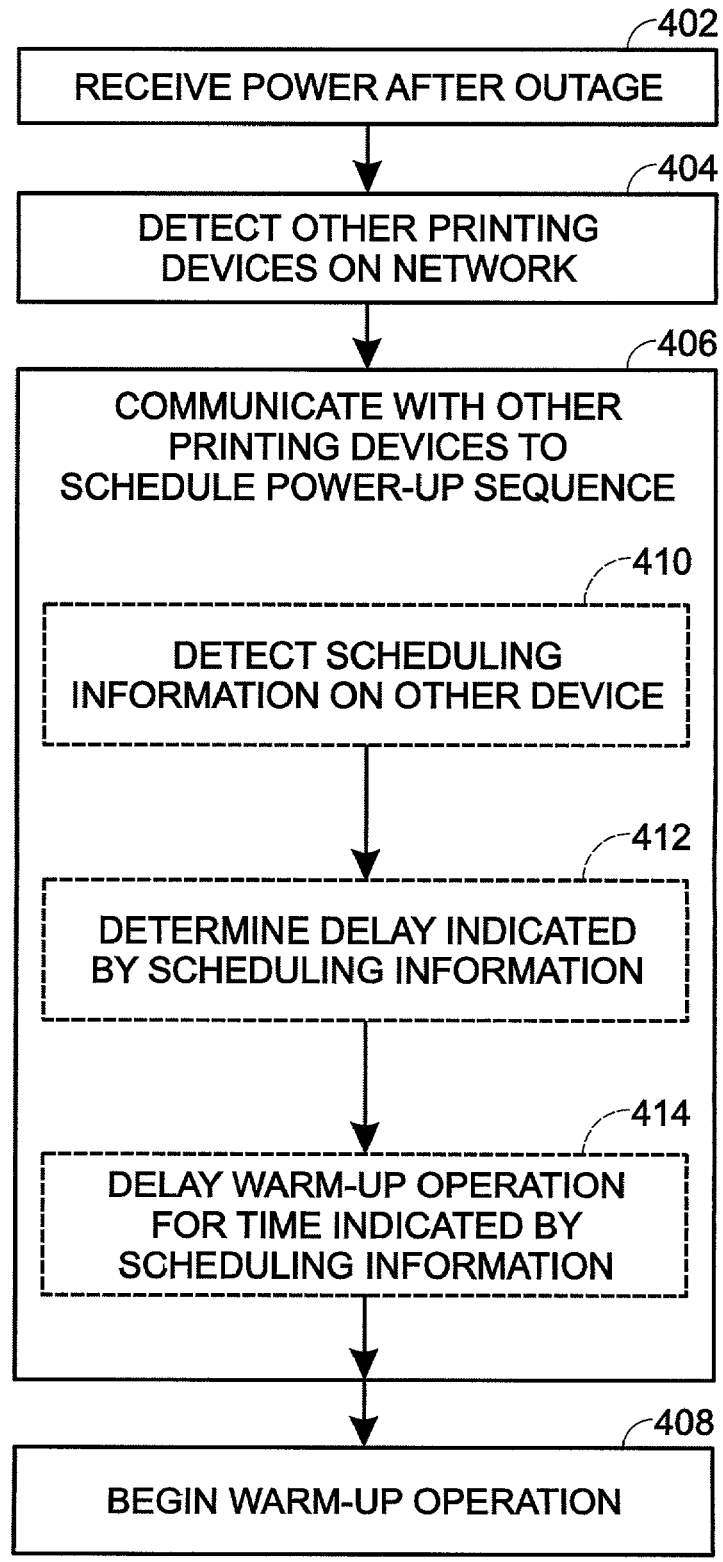
FIG. 7 is a flow diagram of a method of powering up a printing device according to still another embodiment of the present invention.

FIGS. 7 and 8 depict methods in which printing device 10 may communicate with other devices on a network to detect delay indicia located on the other devices. First, FIG. 7 shows, generally at 400, a fourth embodiment of a method of powering up a printing device after a power interruption, in which printing device 10 may communicate with other printing devices on a network to detect delay indicia and determine how long of a delay may be indicated by the delay indicia. As used in the following description of method 400, the word "network" can describe either data network 300, or a power line 310 or 312.

Method 400 first includes receiving power after an interruption at 402, and detecting other printing devices on network 300 at 404. Once another printing device has been detected, printing device 10 may communicate with the other printing device at 406 to schedule a printing device power-up sequence in which different printing devices on the network commence fuser warm-up at different times. After scheduling the power-up sequence at 406, printing device 10 commences fuser warm-up according to the scheduling information at 408.

Printing device 10 may be configured to detect other printing devices on the network in any suitable manner. For example, if printing device 10 is configured to detect other printing devices over data network 300, then the other devices may be detected via ordinary data network communication protocols. Likewise, if printing device 10 is configured to detect other printing devices over a power line network, it may do so using any desired power line networking protocols. Detecting other printing devices on the same power line offers the advantage that the power-up of each printing device on the power line can be scheduled relative to other devices on the same power line, decreasing the likelihood that too many printing devices on the same power line will warm up their fusers simultaneously.

Similarly, communicating with other printing devices to schedule a power-up sequence at 406 may be performed in any suitable manner, and may include several sub-steps. For example, communicating with other printing devices at 406 may include detecting delay indicia in the form of scheduling information located on another network device, as indicated at 410, and then determining the delay indicated by the scheduling information at 412. The scheduling information may include any information configured to cause different printing devices to commence fuser warm-up operations at different times. For example, the scheduling information may include a list containing a plurality of different possible delay periods (i.e. different states of the delay indicia) such that a different delay period is communicated to each printing device on the network. Next, printing device 10 delays commencement of the fuser warm-up operation for the indicated amount of time at 414, and then commences the warm-up operation at 408 once the delay is over.

FIG. 8 shows, generally at 500, a fifth embodiment of a method of powering up a printer according to the present invention. In contrast to method 400, in which printing devices communicate with one another in a peer-to-peer relationship, in method 500, printing device 10 may communicate with a server. Method 500 begins at 502 with the restoration of power to printing device 10 after a power interruption. Next, printing device 10 may communicate with a server, either a file server 308 or a printer server 304, to detect delay indicia in the form of print jobs waiting to be spooled to the printing device. The absence of any print jobs waiting to be spooled to printing device 310 may correspond to the delay-indicating state. If it is determined at 504 that there are print jobs waiting to be spooled to the printing device, then the print jobs may be sent to the printing device at 508, triggering fuser warm-up to begin. If, however, there are no print jobs waiting to be spooled to printing device 10, then printing device 10 may delay commencement of the fuser warm-up operation at 506. The delay of commencement of the fuser warm-up operation may continue until the receipt of a new print job at 508, at which time the fuser warm-up operation begin at 510.

While the various embodiments of the present invention have been described above in the context of a printing device, it will be appreciated that the principles embodied therein may be applied to any situation in which a plurality of devices that require a large amount of electrical current while warming up may simultaneously start warming up after a power interruption.

The disclosure set forth above encompasses multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious and directed to one of the inventions. These claims may refer to "an" element or "a first" element or the equivalent thereof; such claims should be understood to include incorporation of one or more such elements, neither requiring nor excluding two or more such elements. Inventions embodied in other combinations and subcombinations of features, functions, elements, and/or properties may be claimed through amendment of the present claims or through presentation of new claims in this or a related application. Such claims, whether directed to a different invention or to the same invention, and whether broader, narrower, equal, or different in scope to the original claims, also are regarded as included within the subject matter of the inventions of the present disclosure.

What is claimed is:

1. A method of powering up a printing device including a component that employs a warm-up operation, the method comprising:
   upon receiving power to the printing device following a period of reduced power, detecting delay indicia; and
   selectively delaying the warm-up operation following the period of reduced power, based on the detected delay indicia; and
   entering a power-save mode in which power to the component that employs the warm-up operation is temporarily suspended, presence of the printing device in the power-save mode serving as delay indicia.

2. The method of claim 1, wherein selectively delaying the warm-up operation includes selectively delaying commencement of the warm-up operation.

3. The method of claim 1, which further comprises, upon receipt of a print job while in the power-save mode, exiting the power-save mode and commencing the warm-up operation.

4. A method of powering up a printing device including a component that employs a warm-up operation, the method comprising:
   upon receiving power to the printing device, detecting delay indicia; and
   selectively delaying the warm-up operation based on the detected delay indicia;
   wherein the printing device is operatively connected to a server, and wherein detecting delay indicia includes determining whether a print job for the printing device is stored on the server, absence of a print job for the printing device serving as delay indicia.

5. The method of claim 4, which further comprises, upon the server receiving of a print job for printing on the printing device, commencing the warm- up operation.

6. A method of powering up a printing device including a component that employs a warm-up operation, the method comprising:

upon receiving power to the printing device, detecting delay indicia; and selectively delaying the warm-up operation based on the detected delay indicia;

wherein detecting delay indicia includes determining power supply voltage, power supply voltage below a predetermined voltage threshold serving as delay indicia.

7. The method of claim 6, which further comprises, upon the power supply voltage reaching the predetermined voltage threshold, commencing the warm-up operation.

8. A storage medium readable b a computing device, the storage medium tangibly embodying instructions executable by the computing device to perform a method of powering up a plurality of printing devices that employ warm-up operations, the method comprising:

detecting delay indicia; and following a power interruption, starting the warm-up operations of individual of the plurality of printing devices at different times after the power interruption, based on the detected delay indicia, wherein starting the warm-up operations for at least one of the plurality of the printers includes slowing the warm-up operation by employing a reduced-power warm-up operation.

9. A storage medium readable by a computing device, the storage medium tangibly embodying instructions executable by the computing device to perform a method of powering up a plurality of printing devices that employ warm-up operations, the method comprising:

detecting delay indicia; and following a power interruption, starting the warm-up operations of individual of the plurailty of printing devices at different times after the power interruption, based on the detected delay indicia;

wherein the storage medium further embodies instructions for entry into a power-save mode in which operating power is temporarily suspended to the plurality of printing devices and for which exit from the power-save mode directs the starting of the warm-up operations.

10. A storage medium readable by a computing device, the storage medium tangibly embodying instructions executable by the computing device to perform a method of powering up a plurality of printing devices that employ warm-un operations, the method comprising:

detecting delay indicia; and following a power interruption, starting the warm-up operations of individual of the plurality of printing devices at different times after the power interruption, based on the detected delay indicia;

wherein absence of a print jab for a one of the plurality of the printing devices in a printing queue serves as delay indicia, and receipt of a print job for a different one of the plurality of printing devices in the printing queue directs the starting of the warm-up operations.

11. A method of powering up a printing device including a fuser, the method comprising:

upon receiving power to the printing device, determining a power supply voltage;

commencing a warm-up of the fuser if the power supply voltage exceeds a predetermined threshold; and delaying the warm up of the fuser if the determining the power supply voltage indicates the power supply voltage exists below the predetermined threshold.

12. A printing device; comprising;

a formatter configured to format Information contained within a print job into a printable form, the formatter including a processor and memory; and a print engine configured to print the information contained within the print job onto media, the print engine including a component that employs a warm-up operation when power is restored to the printing device after a power-down;

wherein the memory of the formatter contains instructions executable by the processor upon power-up to inspect delay indicia before commencing the warm-up operation to determine delay, and to delay the warm-up operation if a delay is indicated by the delay indicia.

13. The printing device of claim 12, wherein the formatter includes non-volatile memory and the print engine has a power-save mode in which power to the component that employs the warm-up operation is temporarily shut off during idle periods, and wherein the delay indicia includes a flag in non-volatile memory that is set to a delay-indicating state when the printing device enters the power save mode.

14. The printing device of claim 12, wherein determining delay includes selecting a delay time from a number of possible delay times.

15. A printing device, comprising:

a formatter configured to format information contained within a print job into a printable form, the formatter including a processor and memory; and a print engine configured to print the information contained within the print job onto media, the print engine including a component that employs a warm-up operation when power is restored to the printing device after a power-down;

wherein the memory of the formatter contains instructions executable by the processor upon power-up to inspect delay indicia before commencing the warm-up operation to determine delay, and to delay the warm-up operation If a delay is indicated by the delay indicia; and wherein the printing device is configured to connect to a network, and the formatter is configured to inspect delay indicia of another device on the network.

* * * * *

UNITED STATES PATENT AND TRADEMARK OFFICE
CERTIFICATE OF CORRECTION

| | | |
|---|---|---|
| PATENT NO. | : 7,136,175 B2 | Page 1 of 1 |
| APPLICATION NO. | : 10/166967 | |
| DATED | : November 14, 2006 | |
| INVENTOR(S) | : Bradley J. Anderson et al. | |

It is certified that error appears in the above-identified patent and that said Letters Patent is hereby corrected as shown below:

In column 9, line 12, in Claim 8, delete "b" and insert -- by --, therefor.

In column 9, line 32, in Claim 9, delete "plurailty" and insert -- plurality --, therefor.

In column 9, line 45, in Claim 10, delete "warm-un" and insert -- warm-up --, therefor.

In column 9, line 51, in Claim 10, delete "jab" and insert -- job --, therefor.

In column 10, line 10, in Claim 12, delete "; comprising;" and insert -- , comprising: --, therefor.

In column 10, line 11, in Claim 12, delete "Information" and insert -- information --, therefor.

In column 10, line 49, in Claim 15, delete "If" and insert -- if --, therefor.

Signed and Sealed this

Thirteenth Day of April, 2010

David J. Kappos
*Director of the United States Patent and Trademark Office*